(12) United States Patent
Entwistle

(10) Patent No.: US 8,057,140 B2
(45) Date of Patent: Nov. 15, 2011

(54) CRADLE ARRANGEMENT

(75) Inventor: Peter M Entwistle, Bookham (GB)

(73) Assignee: Rolls-Royce PLC, London (GB)

( * ) Notice: Subject to any disclaimer, the term of this patent is extended or adjusted under 35 U.S.C. 154(b) by 308 days.

(21) Appl. No.: 12/453,206

(22) Filed: May 1, 2009

(65) Prior Publication Data

US 2009/0297287 A1 Dec. 3, 2009

(30) Foreign Application Priority Data

May 29, 2008 (GB) .................................. 0809645.5

(51) Int. Cl.
*B60P 7/12* (2006.01)
(52) U.S. Cl. ........................................................ 410/47
(58) Field of Classification Search .................... 410/46, 410/47, 49; 224/533, 570
See application file for complete search history.

(56) References Cited

U.S. PATENT DOCUMENTS

| | | | |
|---|---|---|---|
| 6,170,141 B1 | 1/2001 | Rossway et al. | |
| 6,334,746 B1 * | 1/2002 | Nguyen et al. | 410/44 |
| 6,546,616 B2 * | 4/2003 | Radowick | 29/720 |
| 7,930,823 B2 * | 4/2011 | Migliore | 29/888.01 |
| 2007/0036627 A1 * | 2/2007 | Wright et al. | 410/49 |
| 2008/0213059 A1 * | 9/2008 | Wright et al. | 410/49 |
| 2011/0031292 A1 * | 2/2011 | Krogh et al. | 224/553 |

* cited by examiner

*Primary Examiner* — H Gutman
(74) *Attorney, Agent, or Firm* — Oliff & Berridge, PLC

(57) ABSTRACT

Transportation of articles such as gas turbine engines can be problematic in view of their size. Traditionally, articles such as gas turbine engines are transported on cradles associated with platforms and bases. It would be desirable to enable manipulation of height and width to allow the assembly of the article, such as a gas turbine engine upon the base to enter apertures such as doors in aircraft fuselages or for minimizing width for road or rail or sea transportation. By providing a cradle, having respective cradle sides projecting from a junction in association with a drive mechanism and each side of the cradle coupled to a pivot arm, control of rotation paths can be achieved. Thus, an article such as a gas turbine engine secured to a cradle arrangement can be manipulated between extremes and alternate configurations, defined by rotation paths, through elective association of one or the other of the pivot arms to the cradle and the base.

26 Claims, 2 Drawing Sheets

CRADLE ARRANGEMENT

CROSS-REFERENCE TO RELATED APPLICATIONS

This application claims priority to British Patent Application No. 0809645.5 filed on May 29, 2008, the contents of which are incorporated herein by reference in their entirety.

BACKGROUND

The present invention relates to cradle arrangements and more particularly to cradle arrangements utilised to transport large items such as gas turbine engines.

It will be appreciated that for convenient transportation of large items such as gas turbine engines, it is necessary to provide an appropriate cradle arrangement. Such cradle arrangements will allow lifting as well as lowering, manipulating, handling and movement of such bulky articles.

Traditional cradle arrangements for transportation of bulky items such as gas turbine engines have included a simple transportation stand. Such stands are also called a transport system or trolley or a dolly. The stand itself includes a base and a cradle formed by upstanding arms to engage appropriate parts of the bulky item, such as a gas turbine engine. Typically, such transportation cradle arrangements have been relatively specific to a particular bulky item. Thus, with regard to a gas turbine engine the cradle as indicated will be formed by upstanding arms, which will present rollers; trunnions; bearings; fasteners or pinned joints; or other means for connecting and securing the bulky gas turbine engine at parts on the gas turbine engine with sufficient strength to allow robust association. In such circumstances, it will be appreciated that the base for the cradle arrangement will typically allow lifting or lowering, and manipulation of the gas turbine engine but once fixed upon the cradle arrangement the whole must be manipulated for loading and access.

As bulky items increase in size it will be understood that problems with transportation increase along with some problems with attaching an engine to a stand and clearance between engine and stand, whilst remaining within acceptable transportation envelopes for different forms of transportation such as air, rail or road.

In view of the above, previous transportation cradles, tend to be labour intensive, require an overhead crane and separate tools and have limited height to width variation. Furthermore, such cradles cannot be readily utilised for final assembly such as with regard to fitting an intake or a hot nozzle to a gas turbine engine whilst in the transportation cradle arrangement.

SUMMARY

In accordance with aspects of the present invention there is provided a cradle arrangement secured upon a base, the cradle arrangement characterized in that a cradle extends from a pivot junction and the base is associated with a pivot arm, the pivot junction associated with a drive mechanism to drive the pivot junction laterally across the base to turn the cradle along a rotation path, the pivot arm secured to the base and to part of the cradle to determine the rotation path.

Generally, the cradle comprises cradle sides extending away from the pivot junction. Each cradle side is associated with a pivot arm either side of the pivot junction. Generally the cradle sides comprise upstanding arm sections extending away from the pivot junction at an angle relative to each other to define the cradle.

Typically, the pivot arm is secured to the base by a hinge pivot. Generally, the pivot arm is secured to the cradle side by a hinge pivot. Advantageously, the pivot arm is detachable from the base and/or the cradle.

Generally, the drive mechanism comprises a driven lead screw or linear piston or chain device or other linear motion device. Typically, the drive mechanism includes a lock mechanism to lock position of the junction.

Advantageously, the arrangement incorporates a lock element to secure the position of the cradle along the rotation path. Typically, the lock element comprises a detent to engage other parts of the arrangement, such as locking the moving components of the cradle to the static/fixed components.

Generally, the cradle side includes a plurality of mountings at different positions to allow association of the pivot arm at one of the different positions on the cradle side. Advantageously, the base includes a plurality of mountings at different positions to allow association of the pivot arm at one of the different positions on the base.

Generally, the base comprises a platform and the cradle extends from the platform. Typically, the base includes lift features.

Generally, the cradle defines handling elements having a predetermined spacing. Generally, the predetermined spacing is adjustable. Possibly, the handling elements include interface rollers.

Generally, the cradle arrangement is for a gas turbine engine. Typically, the cradle arrangement for a gas turbine engine includes two upstanding pairs of cradle arms at laterally spaced positions in the cradle to define respective parts of each cradle side in order to engage the gas turbine engine to retain position on the stand.

Typically, the cradle arrangement defines different rotation paths when a pivot arm is secured to one cradle side compared to the rotation path define when another pivot arm is secured to the other cradle side. Generally, the rotation paths coincide at an intermediate position. Typically, the intermediate position is a loading configuration for the arrangement for loading or attaching or installing the load to the cradle.

Embodiments of aspects of the present invention will now be described by way of example and with reference to the accompanying drawings in which:—

DETAILED DESCRIPTION

As indicated above, use of transportation stands in the form of cradle arrangements has particular advantages with respect to transportation of bulky items such as gas turbine engines. It will be appreciated that such items are irregularly shaped but have significant dimensions in terms of height and width. Simply presenting the bulky items such as a gas turbine engine upon a static stand arrangement may not be advantageous and may be constrictive in terms of the best form of transportation. It will be understood that transportation may be by road, rail, sea or air. In such circumstances it is necessary to load the cradle arrangement with a bulky item such as a gas turbine engine then dependent upon the mode of transportation or changes in mode of transport manipulate the cradle arrangement for best advantage. In such circumstances with respect to air transportation it will be necessary to manipulate the cradle arrangement as well as the gas turbine engine into and through a cargo aircraft fuselage opening door, which may be wider but have a reduced height in comparison with the interior of the fuselage. Similarly with regard to road transportation it may be advantageous to slew the bulky gas turbine engine to one side in order to reduce height and therefore improve acceptability with regard to transportation where it may be necessary to limit width and/or height relative to clearances necessary for bridges or wide load highway regulations.

Figure 1:
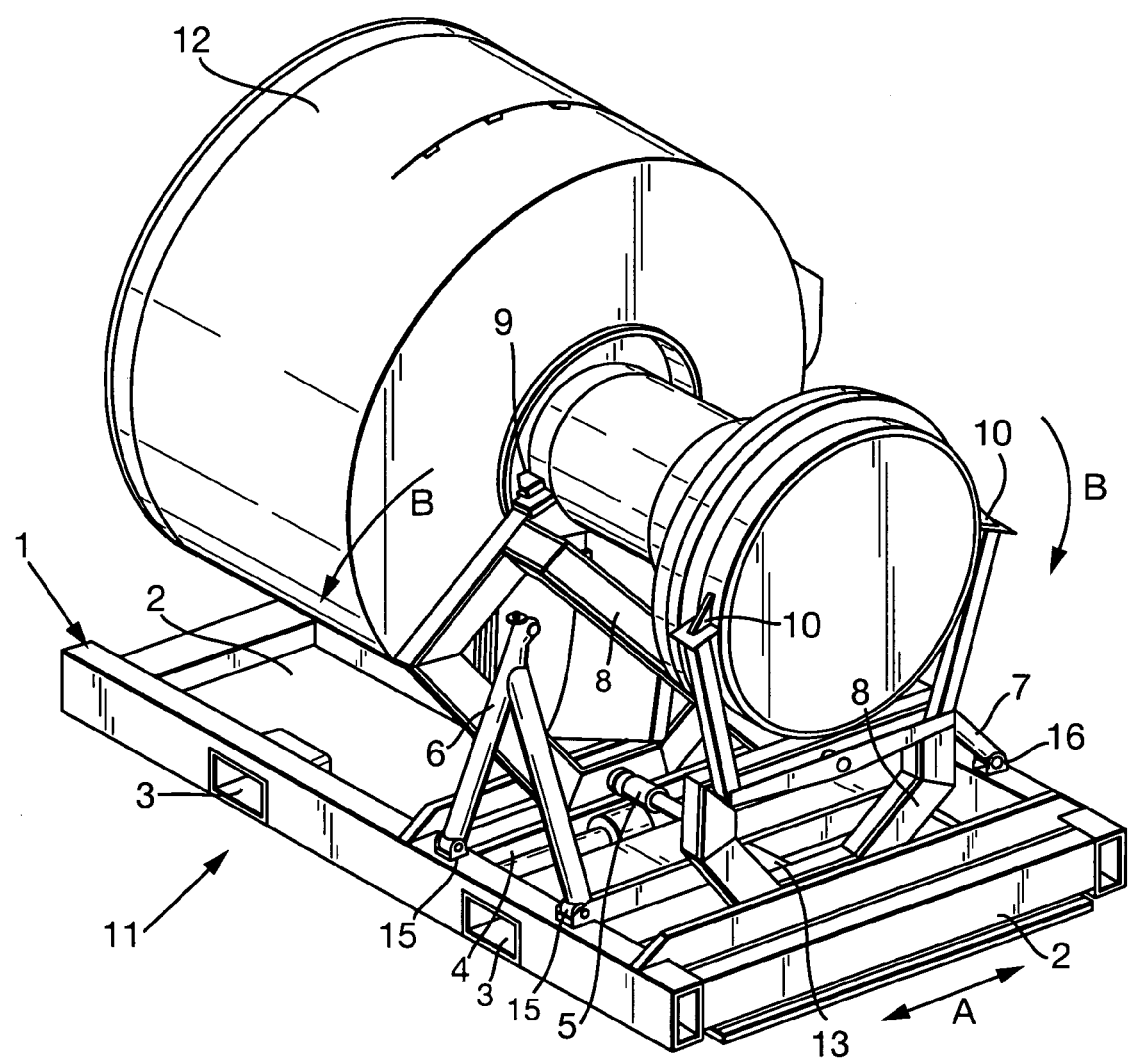
FIG. 1 is a part schematic perspective view of a cradle arrangement in accordance with aspects of the present invention associated with a gas turbine engine.

FIG. 1 provides a rear perspective view of a cradle arrangement 11 in accordance with aspects of the present invention, associated with a gas turbine engine 12. The gas turbine engine 12 is secured to/in a cradle 8. Parts of the cradle 8 define mounting or handling elements 9, 10 for association with appropriately structurally robust parts of the engine 12 for transportation.

The cradle 8 comprises upstanding cradle arms extending from a pivot junction 13 to define sides for the cradle 8. The junction 13 allows the cradle to pivot when driven by a drive mechanism 5 laterally in the direction of arrow heads A. Thus, the cradle 8 will subtend a defined rotation path as the junction 13 moves laterally when driven by the drive mechanism 5.

The drive mechanism 5 typically comprises a lead screw driven by an appropriate motor or by hand. Alternatively, the drive mechanism may comprise a linear piston driven by hydraulic or pneumatic pressure or chain drive, or other linear motion device. However, it is important that there is control of rotation of the cradle 8 along the rotation paths illustrated by arrowheads B as depicted in FIG. 1, in order to correctly position the cradle 8 and therefore the engine 12.

The cradle 8 is presented upon a base 1, which is turn may also be presented upon a pallet 2 but in any event typically lift features, such as fork channels for fork lift truck fork tines entry or a lifting eye, are provided to allow lifting of the cradle arrangement 11 in use.

It will be noted that the drive mechanism 5 is generally presented upon a robust member 4, extending across the base 1 to define the lateral path through which the drive mechanism 5 and therefore the junction 13 moves in turning the cradle 8 along the rotation paths defined by arrowheads B.

The drive mechanism 5 in association with the junction 13 of the cradle 8 will be relatively robust. It will be understood that typically the association will be through screw thread engagement and so will not be dependable for stable long term transportation purposes. In such circumstances the drive mechanism 5 will typically incorporate interlocks, which will secure positioning of the cradle 8 and, therefore, the engine 12 at desired positions along the rotation paths defined by arrowheads B. Additionally, separate locking mechanisms and/or elements (not shown) may be utilised to secure cradle 8 position in use. These locking mechanisms may comprise bolts or detents which engage other parts of the arrangement 11 with moving parts secured to fixed parts to immobilise the arrangement. Such stable locking mechanisms may be provided at pre-determined positions upon the arc subtended by the cradle 8 as illustrated by arrowheads B.

It will be understood that in order to define the rotation paths B it is necessary to associate pivot arms 6, 7 with the cradle 8. The pivot arms 6, 7 are generally secured by pivot hinges 15, 16 respectively. The pivot arms 6, 7 can be permanently secured as illustrated to the base 1 by the pivot hinges 15, 16 or alternatively may be detachable. However, generally these arms 6, 7 will also stabilise the arrangement 11 in use and therefore will be permanently attached. The pivot arms 6, 7 are also associated with the cradle 8 at appropriate positions on each cradle side. In such circumstances, when only one cradle arm 6, 7 is associated with the cradle, it will be appreciated that lateral movements of the junction 13 through the drive mechanism 5 will move the cradle 8 along the rotation paths B. There will be two rotation paths defined respectively by each of the pivot arms 6, 7 when one arm 6, 7 is attached and the other detached and a composite path when both arms remain attached. If both arms remain attached careful consideration must be made of arm length and shape and possibly some capability for adjustment provided.

In accordance with aspects of the present invention the cradle arrangement 11 combines principles of a roll over bar with pivoting and a linkage mechanism to define the respective rotation paths B. As indicated, it is important that the bulky item, such a gas turbine engine 12, is supported and secured in the cradle arrangement 11 for transportation. Such secure location is through handling features on the item transported such as with an engine core features at the tail end housing 10 or intermediate features 9. Generally, secure location is on both sides of the engine 12 at approximately 3 O'clock and 9 O'clock locations for robust location but other positions and separations could be used dependent upon requirements to other positions.

It will be appreciated that the cradle 8 utilised will have angles and a geometry dependant upon the necessary roll and height variation requirement. For example, the pivot arm rotation paths may be defined for 40° in one direction and 50° in the other direction giving a total of 90° in roll. However, other rotation path ranges may be achievable dependent upon the article to be transported and operational requirements. These rotation paths B as indicated will depend upon cradle arrangement 11 geometry in terms of relative positions and lengths for the pivot arms 6, 7 and lateral translation lengths or distances for the pivot junction (13).

It will be understood that for structural integrity and ease of operation, the cradle 8 will typically be designed to provide a right angle structure for association with the gas turbine engine 12. However, other angular relationships in the cradle 8 may be utilised where required. Generally, when the cradle 8 is rolled along the rotation paths B about its base, in either direction, one side or members of the cradle 8 will become parallel to the base 1 and therefore can be easily locked in position through pegs or other latch lock mechanisms between that member of the cradle 8 and the base 1.

As indicated above, in order to achieve roll, the cradle 8 will pivot about the drive mechanism 5 at the pivot junction 13 in order to rotate the cradle 8 through and along the rotation path B between two extreme positions. These extreme positions, as indicated, will typically relate to elements on one side or the other of the cradle 8 engaging parts of the base 1. Rotation is achieved by rolling through the action of the drive mechanism 5 and the hinge point created by the pivot arms 6, 7. During rotation the action of the drive mechanism 5 retains the object securely. The object such as engine 12 and the cradle 8 may be in a central position relative to the base 1 but other geometries are possible. Thus, the engine 12 is rotated about its principal axis for stability, whilst the assembly of the arrangement 11 and engine 12 can be manipulated for different overall heights and widths. In such circumstances, cradle arrangements 11 in accordance with aspects of the present invention, allow rotation and height change within the space constraints presented. In such circumstances, for example with the engine 12, it is possible to roll and lower the position to allow the engine 12 and cradle arrangement 11 to pass through a fuselage door in a cargo aircraft to allow transportation.

Figure 2:
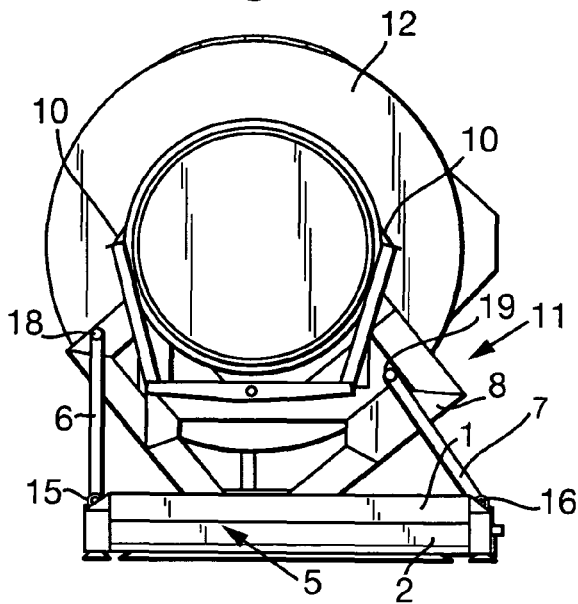
FIG. 2 is a rear view of a cradle arrangement associated with a gas turbine engine in a first configuration.

FIG. 2 provides an illustration of the cradle arrangement 11 with the engine 12. Thus, the engine 12 has been lowered onto the cradle 8 and in particular into engagement with the handling elements 10 in an upright position. In such a condition, the engine 12 is attached to the cradle arrangement 11 through appropriate handling elements as described above. The location of such engagement as indicated is generally upon parts of the engine 12 which have the necessary robustness and structural integrity to retain location of the engine 12 during transportation. As can be seen upon engine 12 loading generally the cradle 8 is centrally positioned through the drive mechanism 5 but other geometries are possible. Furthermore, both the pivot arms 6, 7 are attached to the base 1 by respective hinges 15, 16 and to the cradle 8 at pivot points 18, 19. In such circumstances, the cradle 8 and the engine 12 are located and held securely upon the base 1 in a generally stable condition.

Figure 3:
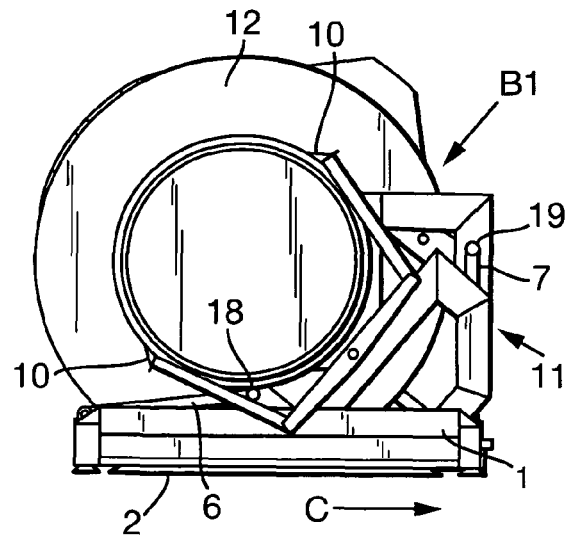
FIG. 3 is a rear view of the cradle arrangement depicted in FIGS. 1 and 2 in a second configuration; and, FIG. 4 is a rear view of the cradle arrangement depicted in FIGS. 1 to 3 in a third configuration.

FIG. 3 illustrates rotation of the cradle arrangement 11 in a first direction along a rotation path B1. This configuration may be to allow for air freight transportation. In such circumstances from a load configuration or position as depicted in FIG. 2, the engine 12 is taken from its upright position to effectively roll over. As indicated above, the degree of roll over is determined by the pivot arm 6. In the example given in FIG. 3, the effective roll over angle is 50°.

To achieve roll firstly the right hand pivot arm 7 is possibly disconnected but there need not necessarily be disconnection dependant on design of linkages and mechanisms. In such a condition the drive mechanism 5 is driven such that the junction 13 of the cradle 8 moves across the cradle arrangement 11 in the direction given by arrowhead C. The left hand pivot arm 6 remains attached and effectively pulls the left side of the cradle 8 down towards the base 1. Once the left side of the cradle 8 typically engages the base 1, that side of the cradle 8 can be locked in position. Furthermore, the right hand pivot arm 7 is then reattached, if necessary, at pivot point 19 to further secure the arrangement 11 in the configuration depicted in FIG. 3. It will also be understood that the drive mechanism 5 may also be locked by suitable lock mechanism but such locking may not be necessary and is dependant on the linear motion device used, and whether it can back drive.

It will be understood with respect to an item such as a gas turbine engine 12 located upon the cradle arrangement 11 consideration will be made to ensure that there is clearance between parts of the engine 12 or other parts of the item and the base and other parts of the cradle arrangement 11 to prevent damage during the rolling action. Throughout the rotation and rolling action, it will be understood that the engine 12 is securely located through the handling element mountings 9, 10. Thus, the engine 12 is securely associated with the cradle 8 by the mechanisms as described above and possibly to increase its stability during transportation by other locked down features between the cradle 8 and the base 1.

Figure 4:
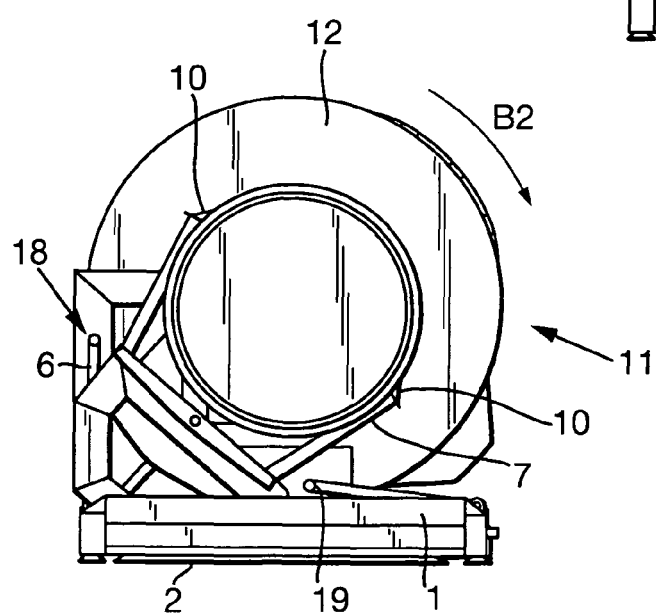

FIG. 4 illustrates the arrangement 11 moving along a rotation path B2 in accordance with further aspects of the present invention to an alternative configuration. In such circumstances, from the load configuration as the upright position depicted in FIG. 2, an engine 12 is effectively rolled over in an alternative direction B2. This rotation may be through an angle of 40° to provide minimum width for road freight transportation. To achieve movement along the rotation path B2 firstly the left hand pivot arm 6 may be disconnected or configured for adjustment and the drive mechanism 5 driven to move the pivot junction 13 of the cradle 8 to the left. In such circumstances the right pivot arm 7 remains attached and effectively pulls the right side of the cradle 8 down and into engagement with the base 1. Once in the configuration as depicted in FIG. 4, the left hand pivot arm 6 is re-attached or locked to provide stability. It will also be understood that the right side of the cradle 8 adjacent to the cradle 1, may be locked in position. Thus, by a combination of the locking mechanisms as described above, as well as locked retention of the drive mechanism towards the left hand side of the base 1, the assembly of the cradle arrangement 11 and the engine 12 is secure. As previously, care must be taken to ensure that in the configuration as depicted in FIG. 4 as well as during the rotation along the rotation path B2, there is adequate clearance between the engine 12 and the base 1 to prevent damage. Throughout the rotation the engine 12 is appropriately secured through handling elements 9, 10. Generally, the cradle 8 is robustly retained in its position through lock mechanisms, including those associated with the drive mechanism 5 and through the pivot arms, 6, 7. To increase stability during transportation other lock down features could be incorporated between the cradle 8 and the base 1.

As indicated above, through use of a cradle arrangement 11 in accordance with aspects of the present invention, an oversized package such as a gas turbine engine 12 can be manipulated on the cradle 8 to meet transportation envelope requirements. These envelope requirements may include necessary manipulation of the overall engine 12 and cradle 11 package or assembly to allow entry through an access door for an aircraft fuselage or to allow the engine to be moved by road or rail or sea transportation by minimising its width or manipulation to gain access during an assembly processes or moving around a site or warehouse or facility. It will be understood that by judicious use of the pivot arms 6, 7, manipulation of the cradle 8 through the drive mechanism 5 acting as a pivot allows selective and elective movement along the rotation paths B. The pivot arms 6, 7 acts as levers and as indicated are generally permanently fixed to the base 1. However, the other ends of the pivot lever arms 6, 7 may be secured to the cradle 8 at different positions to alter and adjust for different angles of rotation along respective rotation paths B in accordance with aspects of the present invention. Thus, the pivot arms 6, 7 may be detachable both from the base as well as the cradle, such that pivot arms of different lengths can be utilised in order to adjust rotation paths B and therefore manipulation capacity with respect to the cradle arrangement. Furthermore, these arms may have different lengths to allow different lock positions for the cradle arrangement 11.

Generally, the base 1, in accordance with aspects of the present invention, may be designed for association with a transportation pallet 2. Thus, the base 1 in accordance with aspects of the present invention may have a narrower width than previous designs, which provided a base stable platform for transportation for articles such as gas turbine engines. It will also be understood that cradle arrangements, in accordance with aspects of the present invention, allow easy association of the engine or other item with the cradle arrangement, whilst avoiding the necessity for additional equipment to allow rolling and manipulation of the engine between configurations advantageous for manipulation during transportation.

Modifications and alterations to aspects of the present invention will be appreciated by those skilled in the art. Thus, for example as indicated, further support and fastening features may be added to the cradle arrangement to provide further transportation security. These further support and fastening features may be added in view of stress analysis of the transported articles, such as a gas turbine engine during typical transportation procedures. It will be understood that the pivot arms 6, 7 as indicated are typically of a fixed length. However, alternatively, these pivot arms may be hydraulic or telescopic to vary their length and therefore the rotation paths for the cradle arrangements to allow manipulation in use.

Although described principally with regard to a gas turbine engine, it will be appreciated that the cradle arrangement, in accordance with aspects of the present invention, allows rolling and lowering of the cradle arrangement in assembly with an article to meet specific envelope requirements for transportation or other means such as with respect to maintenance or inspection. Thus, the cradle arrangement, in accordance with aspects of the present invention, provides a stand alone typically bespoke cradle with a known set floor space requirement but allowing height and width manipulation to accommodate particularly access restrictions.

I claim:

1. A cradle arrangement secured upon a base, the cradle arrangement comprising:
    a pivot junction;
    a cradle including first and second cradle sides extending away from the pivot junction; and
    a first pivot arm secured to the base and to a part of the cradle so as to define a first rotation path, wherein
       the pivot junction is associated with a drive mechanism configured to drive the pivot junction laterally across the base so as to turn the cradle along the first rotation path, and
       the first cradle side is associated with the first pivot arm at a first side of the pivot junction and the second cradle side is associated with a second pivot arm at a second side of the pivot junction.

2. The cradle arrangement of claim 1, wherein the first pivot arm is secured to the base by a hinge pivot.

3. The cradle arrangement of claim 1, wherein the first pivot arm is secured to the first cradle side by a hinge pivot.

4. The cradle arrangement of claim 1, wherein the first pivot arm is detachable from at least one of the base and the cradle.

5. The cradle arrangement of claim 1, wherein the drive mechanism comprises one of a driven lead screw, a linear piston, or a chain drive.

6. The cradle arrangement of claim 1, wherein the drive mechanism includes a lock mechanism configured to lock a position of the pivot junction.

7. The cradle arrangement of claim 1, wherein the base comprises a platform or a pallet and the cradle extends from the platform or the pallet.

8. The cradle arrangement of claim 7, wherein the platform includes fork channels configured to accept lift truck fork tines.

9. The cradle arrangement of claim 1, wherein the cradle defines handling elements having a predetermined spacing.

10. The cradle arrangement of claim 9, wherein the predetermined spacing is adjustable.

11. A cradle arrangement secured upon a base, the cradle arrangement comprising:
    a pivot junction;
    a cradle including first and second cradle sides extending away from the pivot junction; and
    a first pivot arm secured to the base and to a part of the cradle so as to define a first rotation path, wherein
       the pivot junction is associated with a drive mechanism configured to drive the pivot junction laterally across the base so as to turn the cradle along the first rotation path, and
       the first and second cradle sides each include upstanding arm sections extending away from the pivot junction at an angle relative to each other so as to define the cradle.

12. An arrangement as claimed in claim 11, wherein the first pivot arm is secured to the base by a hinge pivot.

13. An arrangement as claimed in claim 11, wherein the first pivot arm is secured to the first cradle side by a hinge pivot.

14. An arrangement as claimed in claim 11, wherein the first pivot arm is detachable from at least one of the base and the cradle.

15. An arrangement as claimed in claim 11, wherein the drive mechanism comprises one of a driven lead screw, a linear piston, or a chain drive.

16. An arrangement as claimed in claim 11, wherein the drive mechanism includes a lock mechanism configured to lock a position of the pivot junction.

17. An arrangement as claimed in claim 11, wherein the base comprises a platform or a pallet and the cradle extends from the platform or the pallet.

18. An arrangement as claimed in claim 17, wherein the platform includes fork channels configured to accept lift truck fork tines.

19. An arrangement as claimed in claim 11, wherein the cradle defines handling elements having a predetermined spacing.

20. An arrangement as claimed in claim 19, wherein the predetermined spacing is adjustable.

21. A cradle arrangement secured upon a base, the cradle arrangement comprising:
    a pivot junction;
    a cradle extending from the pivot junction;
    a first pivot arm secured to the base and to a part of the cradle so as to define a first rotation path; and
    a lock element configured to secure a position of the cradle along the first rotation path, wherein
       the pivot junction is associated with a drive mechanism configured to drive the pivot junction laterally across the base so as to turn the cradle along the first rotation path, and
       the lock element includes a detent configured to engage and immobilize the cradle.

22. A cradle arrangement secured upon a base, the cradle arrangement comprising:
    a pivot junction;
    a cradle extending from the pivot junction, the cradle including a first cradle side; and
    a first pivot arm secured to the base and to a part of the cradle so as to define a first rotation path, wherein
    the first cradle side includes a plurality of mountings at different positions to allow association of the first pivot arm at one of the different positions on the first cradle side, and
       the pivot junction is associated with a drive mechanism configured to drive the pivot junction laterally across the base so as to turn the cradle along the first rotation path.

23. A cradle arrangement secured upon a base, the cradle arrangement comprising:
    a pivot junction;
    a cradle extending from the pivot junction; and
    a first pivot arm secured to the base and to a part of the cradle so as to define a first rotation path, wherein the pivot junction is associated with a drive mechanism configured to drive the pivot junction laterally across the base so as to turn the cradle along the first rotation path, and the base includes a plurality of mountings at different positions to allow association of the first pivot arm at one of the different positions on the base.

24. A cradle arrangement secured upon a base, the cradle arrangement comprising:

a pivot junction;

a cradle extending from the pivot junction; and a first pivot arm secured to the base and to a part of the cradle so as to define a first rotation path, wherein the pivot junction is associated with a drive mechanism configured to drive the pivot junction laterally across the base so as to turn the cradle along the first rotation path, and the cradle arrangement is configured for a gas turbine engine and includes two upstanding pairs of cradle arms at laterally spaced positions in the cradle so as to define respective parts of first and second cradle sides to engage and retain the gas turbine engine on the cradle.

25. A cradle arrangement secured upon a base, the cradle arrangement comprising:

a pivot junction;

a cradle extending away from the pivot junction, the cradle including a first cradle side and a seemed cradle side;

a first pivot arm secured to the base and to the first cradle side so as to define a first rotation path; and a second pivot arm secured to the second cradle side so as to define a second rotation path, wherein the pivot junction is associated with a drive mechanism configured to drive the pivot junction laterally across the base so as to turn the cradle along the first rotation path.

26. The cradle arrangement of claim 25, wherein the first pivot arm and the second pivot arm remain attached during movement along the first rotation path and the second rotation path by at least one of relative adjustment and shaping of at least one of the first and second pivot arms.

* * * * *